(12) United States Patent
Yang

(10) Patent No.: US 8,725,383 B2
(45) Date of Patent: May 13, 2014

(54) INTEGRALLY COMBINED OPERATIVE CONTROL UNIT HAVING MULTIPLE OPERATIVE DEVICES OF DIFFERENT TYPES

(76) Inventor: Tai-Her Yang, Dzan-Hwa (TW)

( * ) Notice: Subject to any disclaimer, the term of this patent is extended or adjusted under 35 U.S.C. 154(b) by 1429 days.

(21) Appl. No.: 12/219,090

(22) Filed: Jul. 16, 2008

(65) Prior Publication Data

US 2010/0017091 A1    Jan. 21, 2010

(51) Int. Cl.
*G06F 19/00* (2011.01)
*G05D 1/00* (2006.01)

(52) U.S. Cl.
USPC .................................................. 701/99; 701/1

(58) Field of Classification Search
None
See application file for complete search history.

(56) References Cited

U.S. PATENT DOCUMENTS

| | | | | |
|---|---|---|---|---|
| 5,966,000 A * | 10/1999 | Yang | | 322/23 |
| 6,023,109 A * | 2/2000 | Yang | | 307/81 |
| 6,028,404 A * | 2/2000 | Yang | | 318/111 |
| 6,097,174 A * | 8/2000 | Yang et al. | | 320/119 |
| 6,297,575 B1 * | 10/2001 | Yang | | 310/266 |
| 6,336,337 B1 * | 1/2002 | Yang et al. | | 62/236 |
| 6,376,932 B1 * | 4/2002 | Yang | | 307/66 |
| RE37,743 E * | 6/2002 | Yang | | 477/3 |
| 6,433,508 B1 * | 8/2002 | Yang | | 320/103 |
| 6,437,544 B1 * | 8/2002 | Yang | | 320/167 |
| 6,459,241 B1 * | 10/2002 | Yang | | 320/132 |
| 6,528,972 B2 * | 3/2003 | Yang | | 320/163 |
| 6,534,956 B2 * | 3/2003 | Yang | | 320/154 |
| 6,552,514 B2 * | 4/2003 | Yang | | 320/125 |
| 6,628,085 B2 * | 9/2003 | Yang | | 315/169.3 |
| 6,657,405 B2 * | 12/2003 | Yang | | 318/123 |
| 6,684,839 B2 * | 2/2004 | Yang | | 123/179.1 |
| 6,777,916 B2 * | 8/2004 | Yang | | 320/146 |
| 6,831,464 B2 * | 12/2004 | Yang | | 324/426 |
| 6,843,751 B2 * | 1/2005 | Yang | | 477/3 |
| 6,904,295 B2 * | 6/2005 | Yang | | 455/522 |
| 6,930,408 B2 * | 8/2005 | Yang | | 307/104 |
| 6,964,311 B2 * | 11/2005 | Yang | | 180/65.1 |
| 7,017,697 B2 * | 3/2006 | Yang | | 180/230 |
| RE39,085 E * | 5/2006 | Yang | | 477/5 |
| 7,151,358 B1 * | 12/2006 | Yang | | 320/119 |
| 7,173,344 B2 * | 2/2007 | Yang | | 290/4 R |
| 7,179,194 B2 * | 2/2007 | Yang | | 477/3 |
| 7,196,430 B2 * | 3/2007 | Yang | | 290/40 C |
| 7,315,090 B2 * | 1/2008 | Yang | | 290/40 C |
| 7,325,524 B2 * | 2/2008 | Yang | | 123/179.28 |
| 7,377,876 B2 * | 5/2008 | Yang | | 477/3 |
| 7,404,783 B2 * | 7/2008 | Yang | | 477/3 |

\* cited by examiner

*Primary Examiner* — Ian Jen
(74) *Attorney, Agent, or Firm* — Bacon & Thomas, PLLC

(57) ABSTRACT

A simple and reliable operative control unit is constituted by at least two mechanism-linked operative control devices of different types aiming to meet the demand for operating driving units of different types. The multiple operative control devices of different types constituting the operative control unit replace a central controller as well as relevant software and monitoring devices so as to reduce the cost and promote reliability.

6 Claims, 1 Drawing Sheet

INTEGRALLY COMBINED OPERATIVE CONTROL UNIT HAVING MULTIPLE OPERATIVE DEVICES OF DIFFERENT TYPES

BACKGROUND OF THE INVENTION (a) Field of the Invention

The present invention relates to an operative control unit constituted directly by integrally operated multiple operative control devices of different types for individually driving different driving units, wherein the particular integrally combined operative control unit replaces a complicated central controller as well as a software and monitoring device, thereby making the system become a characteristically simpler and more reliable operative control device.

(b) Description of the Prior Art

The interactive relationships among the conventional multiple output operative control units of different types are usually correspondingly handled by a central controller, which has a more complicated structure.

SUMMARY OF THE INVENTION

The present invention provides a mechanism that directly mechanically links movable parts of operative control devices of different types to constitute an integrally driven operative control unit for driving individually different driving units, eliminating the need for a complicated central controller.

DESCRIPTION OF MAIN COMPONENT SYMBOLS

101 Operative control device
102: Integrally combined operative control unit
103: Driving interface device
104: Driving unit operative control interface
105: Driving units

DETAILED DESCRIPTION OF THE PREFERRED EMBODIMENTS

The present invention provides an operative control unit constituted directly by integrally operated multiple operative control devices of different types for driving individual different driving units so as to replace a complicated central controller as well as a software and monitoring device.

The interactive relationships among conventional multiple output operative control units of different types are usually correspondingly handled by a central controller which has a more complicated structure.

The present invention uses a mechanism to directly link operative control devices of different types so as to constitute an integrally driven operative control unit for driving the individually different driving units in order to overcome the disadvantage of over-complication of the conventional central controller.

Figure 1:
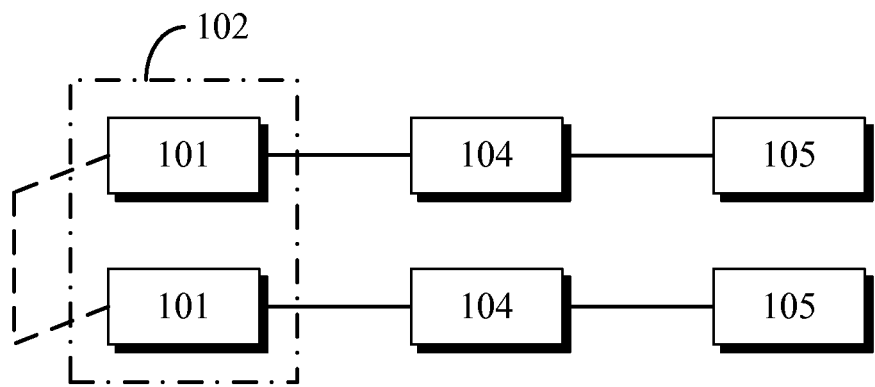
FIG. 1 is a block schematic view of the system of the present invention, which has an operative control unit constituted by integrally combined multiple operative control devices of different types.

FIG. 1 is a block schematic view of the system of the present invention, having an operative control unit constituted by integrally combined multiple operative control devices of different types.

Figure 2:
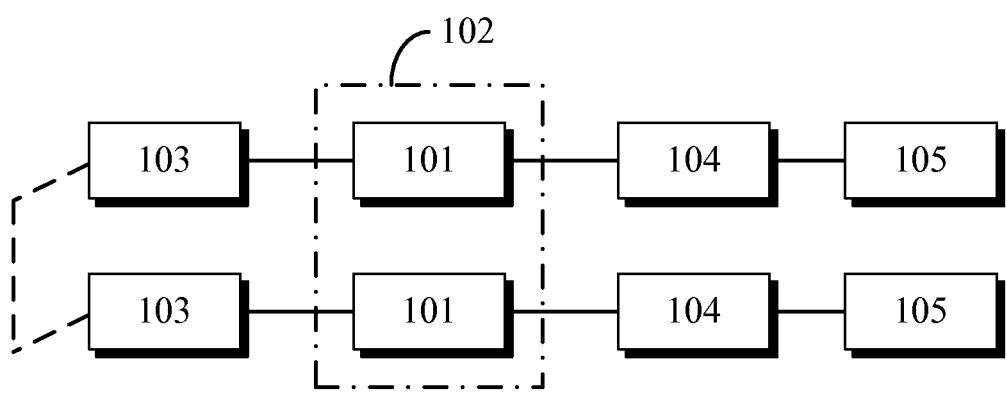
FIG. 2 is a block schematic view of the system of FIG. 1, which is additionally installed with a driving interface device for indirectly driving the operative control device.

As shown in FIG. 1, the integrally combined operative control unit (102) is mainly constituted by linking the multiple operative control units of different types (101) through a device-linking or linkage mechanism, wherein the operative control devices (101) are operated in the following one or more than one operating embodiments which includes:

(1) The operative control devices (101) are directly manually operated; or (2) The operative control devices (101) are indirectly manually operated via the driving interface device (103), shown in FIG. 2; or (3) The operative control devices (101) are operatively controlled by a signal via the driving interface device (103) shown in FIG. 2 to commonly drive the operative control devices of different types (101), wherein the driving unit operative control interfaces (104) of the individually different driving units (105) are operatively controlled by the individual operative control device of different types (101) so as to operatively control the individually different driving units (105).

The aforesaid driving unit operative control interfaces (104) operatively controlled by the individually different operative control devices (101) comprise at least two respective different driving unit operative control devices (104) according to the difference between individually operatively controlled driving units (105), wherein the selectable driving unit operative control devices (104) include:

Fuel throttle control device of the engine unit; or
Operative control device of hydraulic actuating unit; or
Operative control device of pneumatic actuating unit; or
Control device for motor unit operation; or
Control device for generator unit operation; or
Control device for power generation or motor unit functional operation on the same electrical machine; or
Control device of solenoid driving unit; or
Control device of mechanical stepped or step-less speed change mechanism unit.

The at least two selected operative control devices of different types (101) that constitute the integrally combined operative control unit (102) of the present invention are constituted by at least two directly manually operated operative control devices (101), or by operative control devices (101) indirectly operatively controlled via driving interface devices (103), or by controlled operative control devices (101) operatively controlled by a signal via the driving interface device (103); wherein the operative control device (101) includes one or more of the following features:

It is constituted by a stepless or multi-staged variable resistor device; or

It is constituted by a stepless or multi-staged variable capacitor device; or

It is constituted by a stepless or multi-staged variable inductor device; or

It is constituted by a stepless or multi-staged variable induction type electric potential device; or It is constituted by a stepless or multi-staged variable magnetic resistor device (Hall component); or It is constituted by a stepless or multi-staged variable optical sensing resistor device; or It is constituted by a stepless or multi-staged optoelectronic transistor device of variable impedance; or It is constituted by a stepless or multi-staged opto-electro converter; or It is constituted by a changeable multi-staged switch; or It is constituted by a rope or linkage driven stepless or multi-staged variable engine-fuel modulating device; or It is constituted by a motor driven stepless or multi-staged variable engine-fuel supply modulating device; or It is constituted by a piezoelectric effect driven stepless or multi-staged variable engine-fuel supply modulating device; or It is constituted by a solenoid driven stepless or multi-staged variable engine-fuel supply modulating device; or It is constituted by a stepless or staged variable operative control device being operated for the functions of detecting or sensing physical translation, sound, light, and electromagnetism, etc.

The multiple operative control devices (101) of different types of the present invention that constitute the integrally combined operative control unit (102) are indirectly manually operated via the driving interface device (103), or operatively controlled by the signal via the driving interface device (103). FIG. 2 is a block schematic view of a variation of the system in FIG. 1 that is additionally installed with a driving interface device (103) for indirectly driving the operative control devices, wherein the installed driving interface device (103) as shown in FIG. 2 is constituted by at least one of the following driving interface devices (103) including:

The hydraulically actuated driving interface device (103); or

The pneumatically actuated driving interface device (103); or

The electromagnetically actuated driving interface device (103); or

The motor actuated driving interface device (103); or

The engine power actuated driving interface device (103).

In practical applications, the aforesaid integrally combined operative control unit constituted by multiple operative control devices of different types is constituted by at least two individual operative control devices (101), including the manually operated operative control devices (101), or operative control devices (101) indirectly operatively controlled via driving interface devices (103) or by a signal via the driving interface device (103), wherein driving methods of the mechanism linkage for integral operation include 1) linear, or 2) rotational, or 3) simultaneously linear and rotational operating methods and corresponding functioning mechanisms.

The aforesaid integrally combined operative control unit having multiple operative control devices of different types comprises at least two individual operative control devices (101) linked by a mechanism to include the directly manually operated operative control devices (101), or the operative control devices (101) indirectly operatively controlled via driving interface devices (103), or the controlled operative control devices (101) operatively controlled by the signal via the driving interface device (103), and also may be installed with switching devices.

The aforesaid integrally combined operative control unit having multiple operative control devices of different types linked by a mechanism for integral operation has at least two individual operative control devices (101) which are constituted by directly manually operated operative control devices (101), or by operative control devices (101) indirectly operatively controlled via driving interface devices (103), or by controlled operative control devices (101) operatively controlled by the signal via the driving interface device (103);

wherein the operative control devices (101) are operated in the following one or more than one operating embodiments, which include:

(1) The operative control device (101) is manually operated; or (2) The operative control device (101) is indirectly manually operated via the driving interface device (103); or (3) The operated operative control devices (101) are mixedly operated in the two operating embodiments of direct manual operation and indirect manual operation via the driving interface device (103).

In addition, one or more than one operating characteristics of the following can be optionally selected according to the needs of the operative control:

(1) For the integrally combined operative control unit having multiple operative control devices of different types of the present invention, the starting points of the integrally operated operative control device of different types (101) can be the same or different; or (2) For the integrally combined operative control unit having multiple operative control devices of different types of the present invention, the closing points of the integrally operated operative control device of different types (101) can be the same or different; or (3) For the integrally combined operative control unit having multiple operative control devices of different types of the present invention, the linear changes of the integrally operated operative control device of different types (101) can be the same or different; or (4) For the integrally combined operative control unit having multiple operative control devices of different types of the present invention, the displacement position of the integrally combined driving mechanism at the linear change starting turning point of the integrally operated operative control device of different types (101) can be the same or different.

The invention claimed is:

1. An integrally combined operative control unit, comprising:
   at least one first operative control device (101) of a first type for controlling a first driving unit (105) through a first driving unit operative control interface (104), said first operative control device being at least partly controlled by moving a first movable part;
   at least one second operative control device (101) of a second type for controlling a second driving unit (105) through a second driving unit operative control interface (104), said second operative control device being at least partly controlled by moving a second movable part, said second type being different than said first type; and
   a mechanical linkage between said first movable part of the first operative control device (101) and said second movable part of the second operative control device (101), said first and second operative control devices thereby forming said integrally combined operative control unit (102) without being connected to a central controller.

2. An integrally combined operative control unit as claimed in claim 1, further comprising driving interface devices (103) linked by said linkage, said driving interface devices (103) receiving at least one of a manual input and a driving signal for causing a respective said first and second operative control devices (101) to control a respective one of said first and second driving units (105) through a respective one of said first and second driving unit operative control interfaces (104).

3. An integrally combined operative control unit as claimed in claim 1, wherein said operative control devices (101)

include at least two different operative control devices selected from the following operative control devices:
- a fuel throttle control device of an engine unit;
- an operative control device of a hydraulic actuating unit;
- an operative control device of a pneumatic actuating unit;
- a control device for motor unit operation;
- a control device for generator unit operation;
- a control device for power generation or motor unit functional operation on a same electrical machine;
- a control device of a solenoid driving unit; and
- a control device of a mechanical stepped or stepless speed change mechanism.

4. An integrally combined operative control unit as claimed in claim 1, wherein the operative control device (101) includes at least one of the following operative control elements having movable parts for connection by said mechanical linkage:
- a stepless or multi-stage variable resistor;
- a stepless or multi-stage variable capacitor;
- a stepless or multi-stage variable inductor;
- a stepless or multi-stage variable induction type electric potential device;
- a stepless or multi-stage variable magnetic resistor device or Hall component;
- a stepless or multi-stage variable optical sensing resistor;
- a stepless or multi-stage optoelectronic transistor device having a variable impedance;
- a stepless or multi-stage opto-electro converter;
- a changeable multi-stage switch;
- ropes or a linkage driven stepless or multi-stage variable engine fuel supply modulating device;
- a motor-driven stepless or multi-stage engine fuel supply modulating device;
- a piezoelectric effect driven stepless or multi-stage variable engine fuel supply modulating device;
- a solenoid-driven stepless or multi-stage variable engine fuel supply modulating device; and
- a stepless or multi-stage variable operative control device that detects a physical translation, sound, light, or electromagnetism.

5. An integrally combined operative control unit as claimed in claim 1, wherein the driving interface device (103) includes a hydraulically, pneumatically, electromagnetically, motor, or engine power actuated driving interface device.

6. An integrally combined operative control unit as claimed in claim 1, wherein wherein said direct linkage is a linearly-driven, rotatably-driven, or linearly and rotatably driven mechanical linkage.

* * * * *